(12) United States Patent
Keller (10) Patent No.: US 11,261,068 B2
(45) Date of Patent: Mar. 1, 2022

(54) STEERING METHOD, INDUSTRIAL TRUCK AND DESTINATION GUIDANCE SYSTEM

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 110 days.

(21) Appl. No.: 15/546,284

(22) PCT Filed: Jan. 28, 2016

(86) PCT No.: PCT/EP2016/051774
§ 371 (c)(1),
(2) Date: Jul. 26, 2017

(87) PCT Pub. No.: WO2016/120371
PCT Pub. Date: Aug. 4, 2016

(65) Prior Publication Data
US 2018/0016124 A1    Jan. 18, 2018

(30) Foreign Application Priority Data

Jan. 30, 2015 (DE) ...................... 10 2015 101 381.9

(51) Int. Cl.
*B66F 9/075* (2006.01)
*G05D 1/02* (2020.01)
*B62D 6/00* (2006.01)
*B62D 7/15* (2006.01)

(52) U.S. Cl.
CPC ............ *B66F 9/0755* (2013.01); *B62D 6/005* (2013.01); *B62D 7/1509* (2013.01); *B66F 9/07568* (2013.01); *G05D 1/024* (2013.01); *G05D 1/0234* (2013.01); *B60L 2200/42* (2013.01); *G05D 2201/0216* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,601,422 A | * | 8/1971 | Woods | ..................... B62D 7/02 180/411 |
| 5,938,710 A | * | 8/1999 | Lanza | ..................... B66F 9/063 180/169 |
| 2002/0069005 A1 | | 6/2002 | Kokura | |
| 2006/0184013 A1 | | 8/2006 | Emanuel et al. | |
| 2006/0247837 A1 | | 11/2006 | Segerljung | |
| 2007/0269299 A1 | | 11/2007 | Ross et al. | |
| 2011/0166721 A1 | | 7/2011 | Castaneda et al. | |

(Continued)

FOREIGN PATENT DOCUMENTS

| | | |
|---|---|---|
| DE | 101 58 245 A1 | 7/2002 |
| EP | 1 532 035 A1 | 5/2005 |

(Continued)

*Primary Examiner* — Maceeh Anwari
(74) *Attorney, Agent, or Firm* — Norman B. Thot (57) ABSTRACT

A steering method of a multi-directional industrial truck for controlling a movement of the multi-directional industrial truck from a starting position into a target position. The method includes selectively controlling automatically at least one of a rotatory component of the movement and a translatory component of the movement.

11 Claims, 4 Drawing Sheets

(56) References Cited

U.S. PATENT DOCUMENTS

2012/0059545 A1* 3/2012 Furuno ............... G05D 1/0234
701/26
2013/0204494 A1* 8/2013 Herschel ............... B62D 5/001
701/42

FOREIGN PATENT DOCUMENTS

EP          2 678 748 B1    4/2015
WO    WO 2008/157749 A2   12/2008

* cited by examiner

STEERING METHOD, INDUSTRIAL TRUCK AND DESTINATION GUIDANCE SYSTEM

CROSS REFERENCE TO PRIOR APPLICATIONS

This application is a U.S. National Phase application under 35 U.S.C. § 371 of international Application No. PCT/EP2016/051774, filed on Jan. 28, 2016 and which claims benefit to German Patent Application No. 10 2015 101 381.9, filed on Jan. 30, 2015. The international Application was published in German on Aug. 4, 2016 as WO 2016/120371 A1 under PCT Article 21(2).

FIELD

The present invention relates to a steering method for industrial trucks, to an industrial truck, and to a route guidance system comprising an industrial truck.

BACKGROUND

Steering methods for industrial trucks, industrial trucks, and route guidance systems comprising industrial trucks have previously been described.

While modern steering systems, in particular for multi-directional industrial trucks, offer virtually unlimited options for manipulating the direction and orientation of the industrial truck, it is nonetheless often extremely difficult for the operator to achieve a target position in one operation without the need for individual corrective movements. Once the operator, during the initial phase, has established a parallel position with the target plane, it will often be almost impossible for him or her to, for example, carry out a defined horizontal positioning maneuver on the remaining travel distance without again losing the parallel position.

SUMMARY

An aspect of the present invention is to provide a steering method for an industrial truck, an industrial truck, and a route guidance system comprising an industrial truck, which are improved with regard to the above described disadvantages.

In an embodiment, the present invention provides a steering method of a multi-directional industrial truck for controlling a movement of the multi-directional industrial truck from a starting position into a target position. The method includes selectively controlling automatically at least one of a rotatory component of the movement and a translatory component of the movement.

BRIEF DESCRIPTION OF THE DRAWINGS

The present invention is described in greater detail below on the basis of embodiments and of the drawings in which.

DETAILED DESCRIPTION

The steering method according to the present invention for controlling a movement of the industrial truck is suitable for multi-directional industrial trucks.

The term "industrial truck" as used herein in particular refers to a piece of transport equipment having wheels that run on the floor and which are freely steerable for transporting, pulling or pushing loads, and the equipment being intended for an in-plant use. The industrial truck can comprise a lifting device.

The term "multi-directional industrial truck" as used herein in particular refers to an industrial truck having wheels that are arbitrarily steerable, i.e., all wheels are arbitrarily steerable.

The steering method according to the present invention is in particular suitable for controlling a movement of the industrial truck from a starting position into a target position. The target position of the industrial truck can, for example, be determined by a location and a rotational orientation of the industrial truck. The rotatory component and/or the translatory component of this movement are selectively controlled automatically.

"Selectively" as used herein in particular means that the operator is able to select between a manual and an automatic control (of the rotatory and/or translatory movement).

The expression "the rotatory component of this movement" as used herein in particular refers to the rotation about a vertical axis extending through the industrial truck.

The operator of an industrial truck can, for example, be supported by the method according to the present invention in aligning the industrial truck with a target plane, at an optionally arbitrary angle (generally parallel and thus 0°), and/or in horizontally positioning the industrial truck with pinpoint precision with respect to a point on the target plane. The precise, necessary movement of the industrial truck for displacement into the target position is advantageously ascertained from the angle with respect to the target plane and/or the horizontal alignment of the industrial truck with respect to the target point.

In a first method step, the necessary rotatory component of this movement is advantageously ascertained separately from the necessary translator component of this movement, and, in a second method step, only the rotatory movement can, for example, be selectively controlled automatically.

In the embodiment of the present invention in which only the rotatory movement component is automatically controlled, the steering method can also be referred to as an "angle correction assistance method."

In another embodiment of the present invention, in a first method step, the necessary translatory component of this movement can, for example, be ascertained separately from the necessary rotatory component of this movement, and, in a second method step, only the translatory movement can, for example, be selectively controlled automatically.

It has been shown that even when either the rotatory or the translatory movement component is implemented automatically, it is relatively easy for the operator to carry out the steering process by him/her implementing the other movement.

It can be advantageous if only exactly one of multiple superimposed movements is automatically controlled.

The method is relatively simple by automatically controlling only one of the two movement components compared to a method in which the rotatory and translatory movement components are controlled automatically. The manufacturing complexity of the associated industrial truck thus decreases. The operator also remains challenged. It is thereby avoided, for example, that his/her attention decreases, and that response times during unexpected events increase.

In an embodiment of the present invention, in a first method step, the necessary translatory component of the movement can, for example, be ascertained together with the necessary rotatory component of the movement, and, in a second method step, the translatory movement and the rotatory movement can, for example, be selectively controlled automatically.

It can be advantageous if the actual rotational position of the industrial truck is selectively measured automatically, and, for example, is compared to a stored or likewise measured target rotational position. In the event of a deviation of the actual rotational position from the target rotational position, a selective automatic steering process can, for example, occur to reduce the deviation.

A selective automatic adjustment of the rotational position of the industrial truck in the narrower sense thereby occurs.

It can be advantageous if the actual rotational position of the industrial truck is ascertained via at least two distance sensors which can advantageously be disposed on the industrial truck. In an embodiment of the present invention, the distance measurement can, for example, be carried out via exactly two, or exactly three, distance sensors.

In an embodiment of the present invention, the actual rotational position of the industrial truck can, for example, be measured only by exactly two, or exactly three, distance sensors.

The distance sensors can, for example, be disposed so as to have the largest possible distance apart from each other on the industrial truck.

In an embodiment of the present invention, the distance sensors can, for example, be disposed outside the wheels of the industrial truck. The distance between the two distance sensors is thereby greater in this embodiment than the distance between two adjoining wheels of the industrial truck.

The distance sensors can advantageously each measure the distance with respect to a target plane.

The term "target plane" as used herein in particular refers to a plane which contains the target point and the rotational position of which, for example, agrees with the corresponding rotational position of the target position.

The rotational position of the target plane can advantageously correspond to the target rotational position.

In an embodiment of the present invention, the actual rotational position can, for example, be measured via, for example, exactly one sensor for geometric surroundings detection. In an embodiment, the actual rotational position of the industrial truck can, for example, be measured via exactly one sensor, for example, for geometric surroundings detection.

In an embodiment of the steering method according to the present invention, the automatic control of the rotatory and/or translatory movement components can, for example, be selected by the operator prior to, or while, manually approaching the target position. The operator may thus initiate the support function prior to, or while, traveling to the end point.

It can be advantageous if the steering device of the industrial truck is thereby prompted to assume the search mode and, for example, searches for suitable geometries and/or markers in the direction of travel. As soon these are detected by the steering device, the steering device can advantageously actively intervene in the steering process and steer the industrial truck at least partially until the identified target position has been reached.

In an embodiment of the method according to the present invention, the steering device of the industrial truck can, for example, continuously search the surroundings for suitable geometries and/or markers, and display the identification thereof to the operator. The operator can then, for example, notify the steering device that an identified geometry is to he considered the target geometry and, in this way, for example, select an automatic control of the rotatory and/or translatory components of the necessary movement.

In this embodiment, the operator, by qualifying an identified geometry as the target geometry, thus advantageously initiates the at least partially supported approach, which may also be referred to as an automatic or semi-automatic approach.

In an embodiment of the present invention, the steering method can, for example, be used to steer towards a target position movable relative to the global coordinate system. The advantages of the present invention here become particularly apparent since this is a difficult steering process for the operator where support is particularly helpful.

In an embodiment of the steering method of the present invention, a manual change of the rotational position of the industrial truck can, for example, be prevented after the rotatory movement component was automatically controlled. The system can advantageously engage the steering in diagonal travel therefor. If deviations again arise, after automatic control of the rotatory movement component, a renewed adjustment can advantageously occur.

The present invention is also achieved by an industrial truck comprising a steering device, wherein the steering device comprises an assistance system for carrying out the steering method, and wherein the assistance system comprises a single-sensor or a multiple-sensor system.

The industrial truck comprises a multi-directional industrial truck.

In an embodiment comprising a multi-sensor system, the industrial truck can, for example, comprise at least two distance sensors, for example, exactly two or exactly three distance sensors, for measuring the actual rotational position of the industrial truck.

In an embodiment of the present invention comprising a multi-sensor system, the industrial truck can, for example, comprise exactly two distance sensors and a (for example, exactly one) positioning sensor for measuring the actual rotational position of the industrial truck. This sensor can, for example, operate optically. It can, for example, cooperate with a reflector which is not itself disposed on the industrial truck but, for example, on the target point to be approached which the sensor detects when the sensor is located in front of the reflector. This sensor can, for example, be used to detect the alignment of the industrial truck in one direction, for example, parallel to the target plane. The distance sensors can, for example, be used to detect the rotational position of the industrial truck, for example, the distance between the industrial truck and the target plane, which is also referred to as the alignment in the y direction herein. The positioning sensor is advantageously used to detect the correct alignment of the industrial truck perpendicularly to the distance from the target plane, i.e., in the x direction. The rotatory and translatory movement components can be automatically controllable in this embodiment.

The distance sensors can, for example, be radar sensors. These can, for example, be laser distance meters.

In an embodiment of the present invention, the industrial truck can, for example, comprise at least one sensor for geometric surroundings detection to measure the actual rotational position of the industrial truck. This sensor may be a distance sensor, for example, such as a laser distance meter, which measures the propagation time and, from these data, forms a depth profile. This may be an optoelectronic laser scanner which measures its surroundings in two-dimensional polar coordinates based on the measuring origin thereof. The sensor can comprise a rotating mirror via which the sensor deflects emitted laser beams and scans the surroundings in a circular manner. In an embodiment comprising a single-sensor system, exactly one such sensor can, for example, be provided.

The present invention is also achieved by a route guidance system comprising an industrial truck and comprising geometries and/or markers not disposed on the industrial truck, wherein the steering method cooperates with the geometries and/or markers, in particular for determining the actual rotational position and/or target rotational position of the industrial truck.

The route guidance system can also comprise geometries and/or markers provided on the industrial truck with which the steering method cooperates.

In an embodiment of the route guidance system of the present invention, the support function, i.e., the automatic control of the rotatory and/or translatory movement components, can, for example, be initiated by the operator prior to or while manually approaching the target position. The steering device of the industrial truck advantageously has a search mode which can be activated by this initiation of the support function. The steering device of the industrial truck is advantageously able to detect suitable geometries and/or markers of the route guidance system in the search mode. The steering device, after having identified the suitable geometries and/or markers, actively intervenes in the steering process and implements the steering process at least partially until the identified target position has been reached.

In an embodiment of the present invention, the surroundings can, for example, be scanned continuously by the steering device of the industrial truck for suitable geometries and/or markers of the route guidance system. Such geometries and/or markers can advantageously be displayed to the operator. An input device is advantageously provided via which the operator can notify the steering device that an identified geometry represents a target geometry, and advantageously, via this notification, can immediately select an automatic control of the rotatory and/or translator movement.

The present invention will be described in greater detail below based on exemplary embodiments shown in the drawings.

Figure 1:
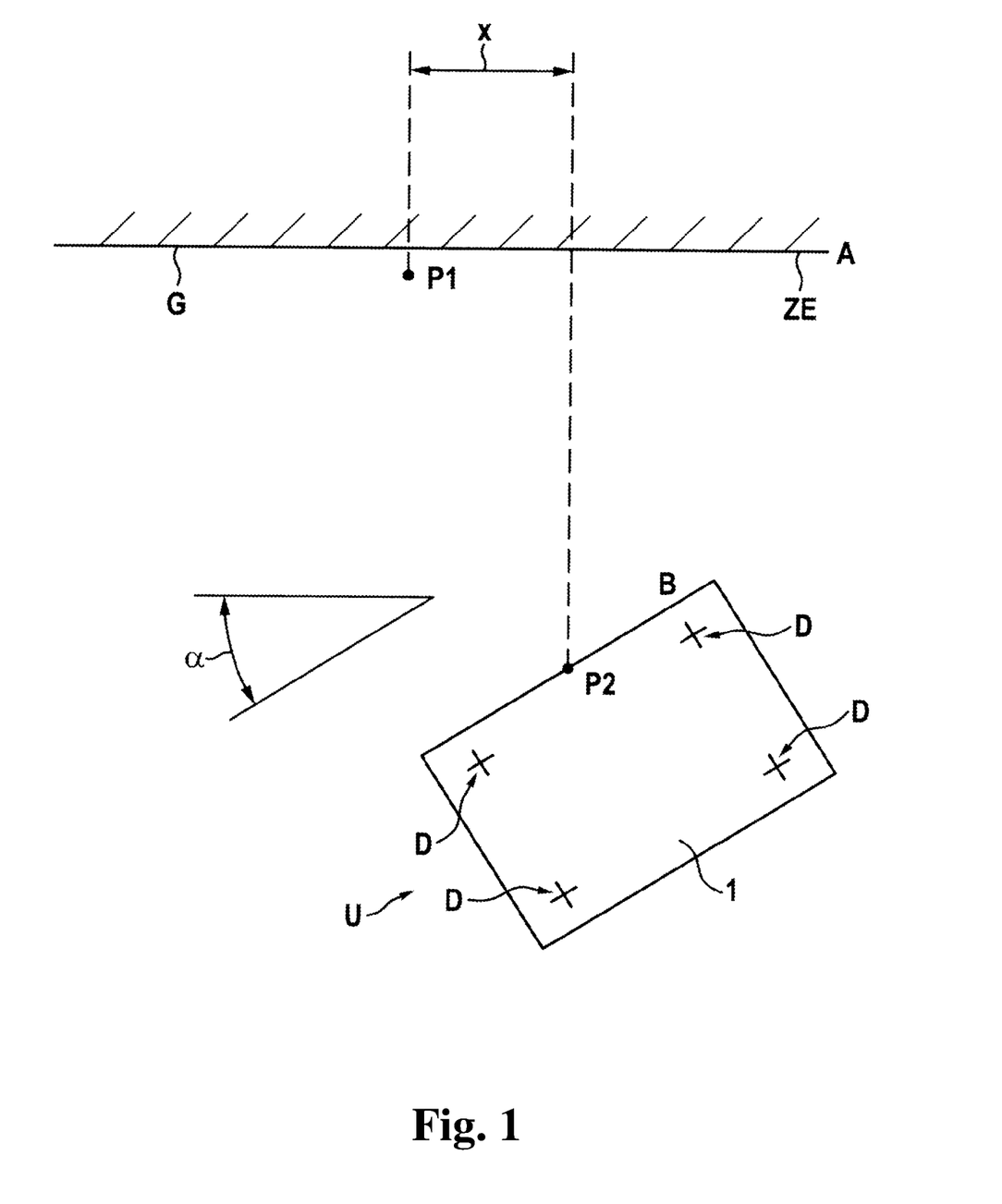
FIG. 1 shows a schematic illustration of a starting position, viewed from above.
Figure 2:
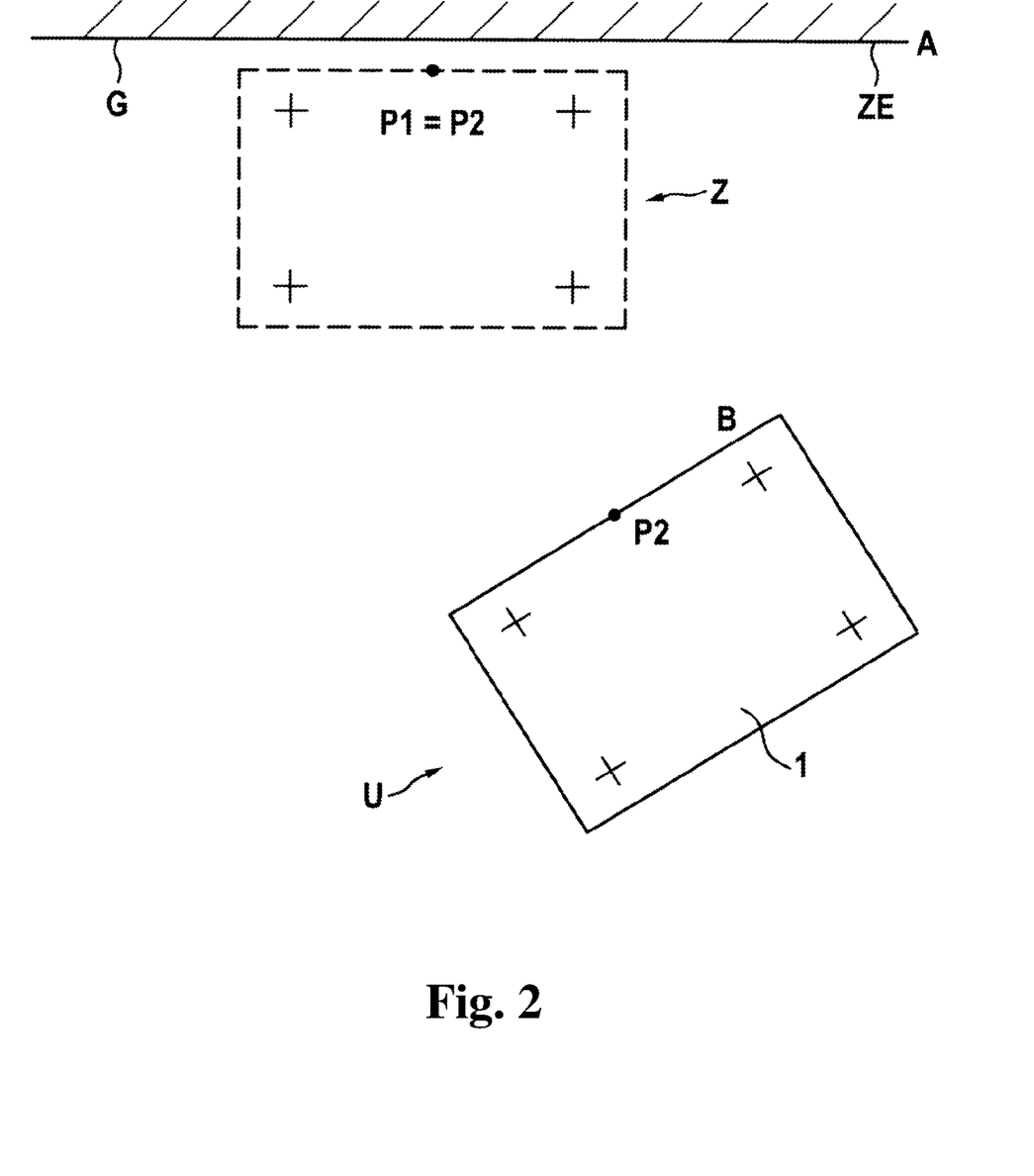
FIG. 2 shows an illustration as in FIG. 1 where the target position is shown by a dotted line.

FIGS. 1 and 2 show a starting situation in which the starting position U of the industrial truck 1, represented by solid lines, deviates from the target position Z, represented by dotted lines in FIG. 2. The vehicle point P2, which is to be moved so as to overlap with the reference point to be approached P1, is situated at a distance therefrom, and the rotational position of the industrial truck 1 deviates by an angle a from the rotational position of the target position Z. The target position Z may also be referred to as the desired end position. The industrial truck 1 has wheels D.

All industrial trucks 1 shown in the drawings are multi-directional industrial trucks. These may, for example, be multi-directional forklifts.

Figure 3:
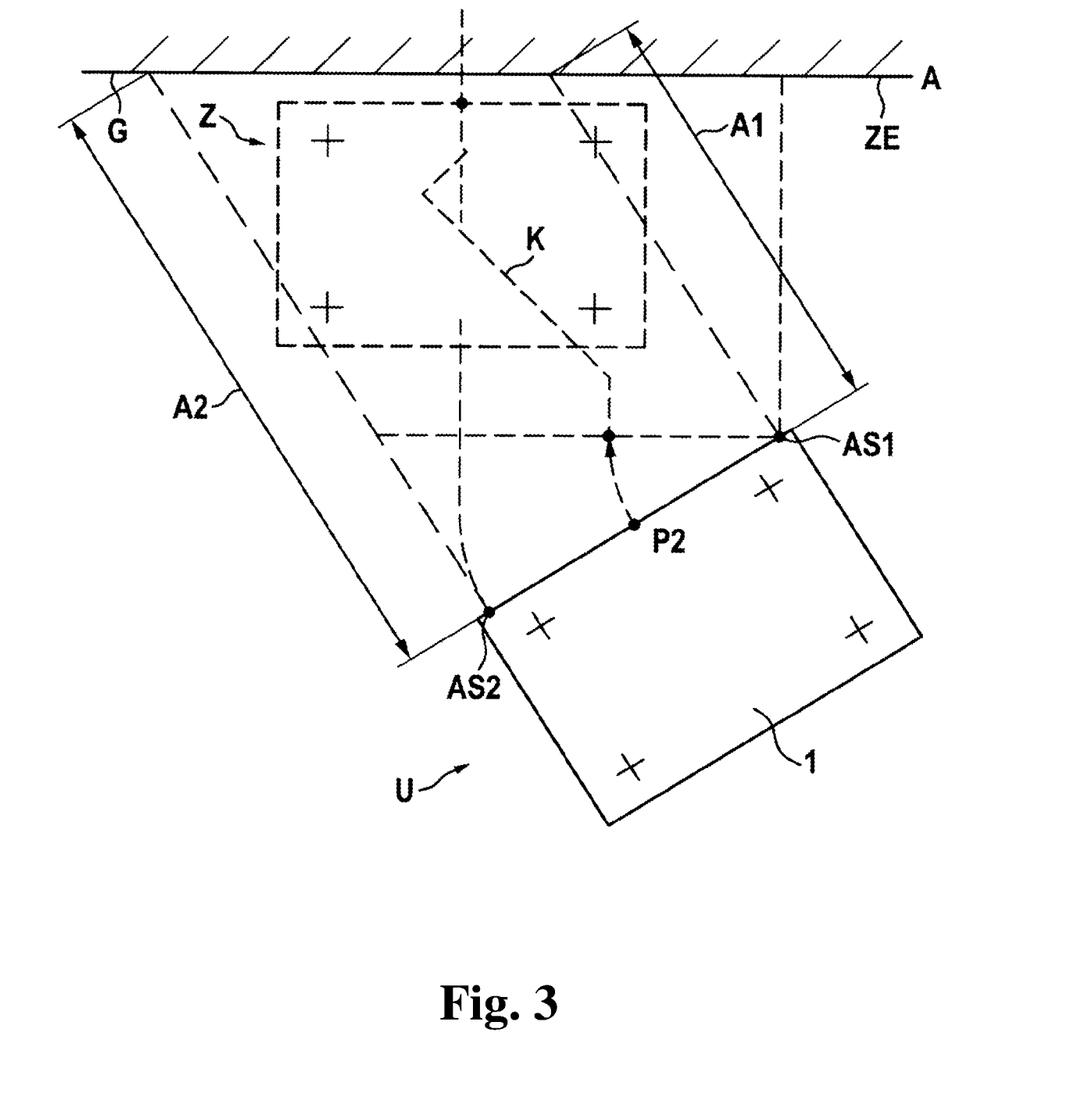
FIG. 3 shows the schematic illustration of a first steering method for reaching the target position.

In the exemplary embodiment shown in FIG. 3, the rotatory movement component of the movement that is necessary to move the industrial truck 1 into the target position Z is controlled automatically. The necessary rotatory movement component is initially ascertained therefor separately from the necessary translatory movement component. This is carried out in that the actual rotational position B (see FIG. 1) of the industrial truck 1 is measured automatically. This position is subsequently compared to the target rotational position A of the target position A, and a steering process is carried out to reduce the deviation α. In the exemplary embodiment shown in FIG. 3, the measurement of the actual rotational position B of the industrial truck 1 takes place by way of a first and a second distance sensor AS1, AS2 disposed on the industrial truck 1. As shown in FIG. 3, the two distance sensors AS1, AS2 are disposed the largest possible distance apart. The two distance sensors each measure a distance A1, A2 with respect to the target plane ZE. A steering process is thereafter carried out automatically so that the deviation of the target rotational position from the actual rotational position is reduced. In the exemplary embodiment shown in FIG. 3, this is carried out by rotating the industrial truck 1 about the point at which the first distance sensor AS1, the right sensor in FIG. 3, is disposed until the distances A1 and A2 agree with one another. The movement option of the industrial truck 1 is thereafter limited to diagonal travel. The system thus engages the steering in diagonal travel. If deviations again arise between the distances A1 and A2, another steering process can, for example, be carried out automatically to reduce the deviation.

A possible travel curve K is plotted in FIG. 3 with a dotted line. The assistance system first corrects the angular deviation a by rotating the vehicle about AS1 until the two measurement values of the distance sensors AS1 and AS2 are identical.

A positioning sensor, which is not shown in the drawings, may be provided which, together with a reflector disposed at the target point, can be used to align the industrial truck 1 in the x direction.

Figure 4:
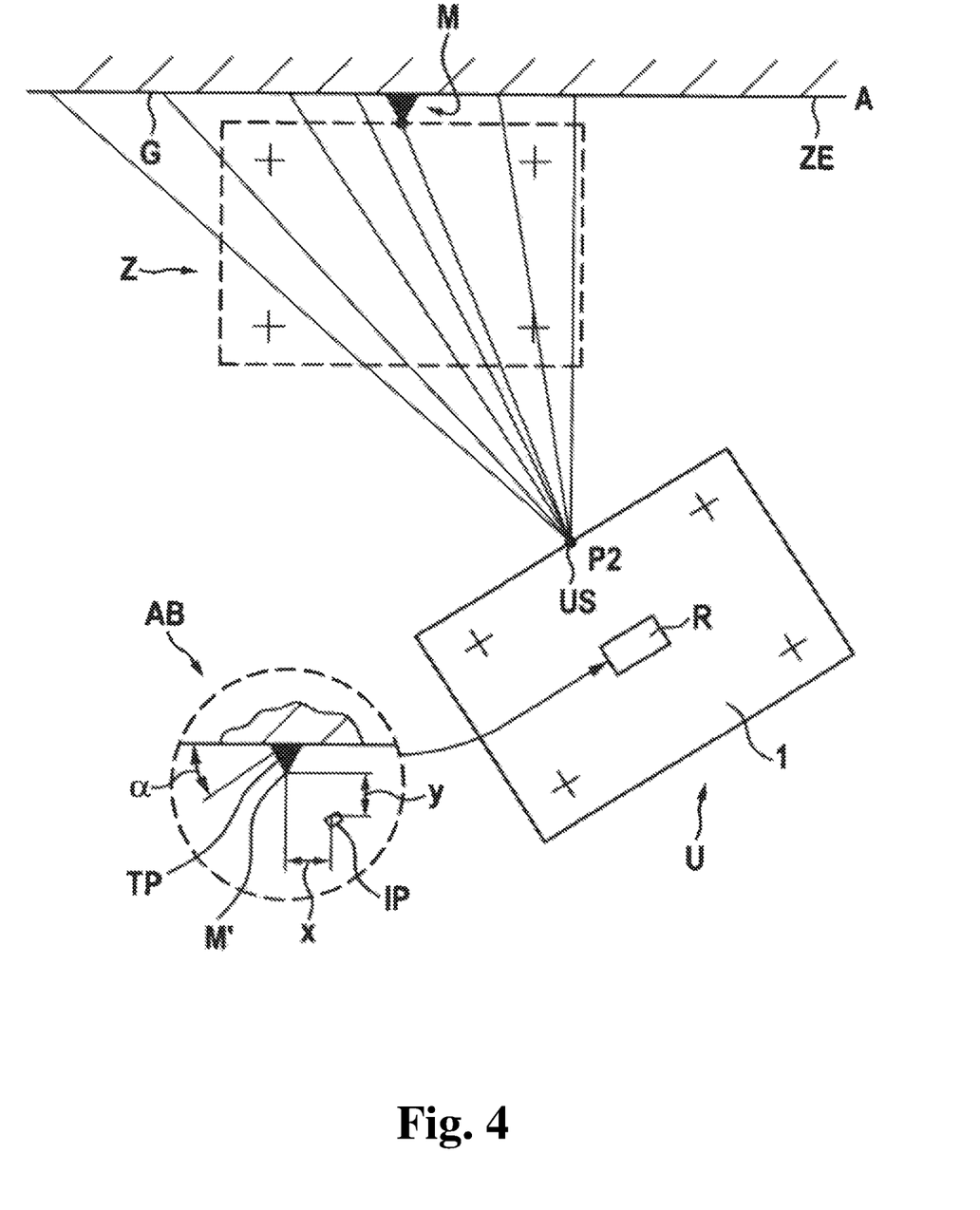
FIG. 4 shows a schematic illustration of a second steering method for reaching the target position.

FIG. 4 shows an exemplary embodiment in which the industrial truck comprises exactly one sensor, in particular a sensor for geometric surroundings detection US.

The industrial truck 1 can, for example, comprise a processor R.

By way of the sensor for geometric surroundings detection US, a map AB of the actual vehicle position comprising a map of a marker M' can, for example, be created in the processor R. A depth profile TP of the surroundings is created in the processor R, and the actual position IP of the industrial truck 1 is ascertained. The rotatory and/or translatory movement components of the necessary movement of the industrial truck 1 for displacement into the target position Z can thereafter be automatically controlled.

The route guidance system of the present invention comprises an industrial truck 1 and geometries G and/or markers M not disposed on the industrial truck 1, wherein the steering method cooperates with the geometries G and/or markers M, in particular for determining the actual rotational position and/or target rotational position of the industrial truck 1.

The present invention is not limited to embodiments described herein: reference should be had to the appended claims.

LIST OF REFERENCE NUMERALS 1 industrial truck
A target rotational position, which may also be referred to as the reference plane
B actual rotational position, which may also be referred to as the vehicle plane with which the reference plane is to become aligned
D wheel
G geometries K possible travel curve
M marker
M' map of a marker
R processor
x horizontal offset between P1 and P2 in the x direction
y horizontal offset between P1 and P2 in the y direction.
U starting position
Z target position
α angle
AB map of the surroundings and of the industrial truck in the actual position
IP actual position of the industrial truck
A1, A2 distances
P1 reference point to he approached
P2 vehicle point which is to be moved so as to overlap with P1
TP depth profile
US sensor for geometric surroundings detection
LE target plane
AS1 first distance sensor
AS2 second distance sensor

What is claimed is:

1. A steering method of a multi-directional industrial truck for controlling a movement of the multi-directional industrial truck from a starting position into a target position, the method comprising:
   controlling automatically at least one of a rotatory component of the movement and a translatory component of the movement;
   selecting, via an operator, an automatic control of the at least one of the rotatory component of the movement and the translatory component of the movement prior to, or while, manually approaching the target position;
   ascertaining an actual rotational position of the multi-directional industrial truck by measuring a distance with respect to a target plane denoting the target position by at least one distance sensor; and
   actively intervening, via a steering device, in the steering method for the multi-directional industrial truck until an identified target position has been reached.

2. The steering method as recited in claim 1, further comprising:
   ascertaining the rotatory component of the movement;
   controlling automatically only the rotatory component of the movement,
   wherein,
   the ascertaining of the rotatory component of the movement is performed separately from an ascertaining of the translatory component of the movement.

3. The steering method as recited in claim 2, further comprising:
   automatically measuring the actual rotational position of the industrial truck;
   comparing the actual rotational position of the multi-directional industrial truck measured to at least one of a stored or measured target rotational position; and
   if a deviation of the actual rotational position of the multi-directional industrial truck from the stored or measured target rotational position exists, selecting an automatic steering process so as to reduce the deviation.

4. The steering method as recited in claim 3, wherein the measurement of the actual rotational position of the multi-directional industrial truck is performed by at least two distance sensors.

5. The steering method as recited in claim 4, wherein the at least two distance sensors are arranged on the multi-directional industrial truck.

6. The steering method as recited in claim 4, wherein the at least two distance sensors are each configured to measure a distance from the respective distance sensor to the target plane.

7. The steering method as recited in claim 3, wherein measurement of the actual rotational position of the multi-directional industrial truck is performed by a sensor for geometric surroundings detection.

8. The steering method as recited in claim 3, wherein the measurement of the actual rotational position of the multi-directional industrial truck is performed by exactly one sensor for geometric surroundings detection.

9. A multi-directional industrial truck comprising a steering device which comprises an assistance system comprising a single-sensor system or a multiple-sensor system, the assistance system being configured to perform a steering method for controlling a movement of the multi-directional industrial truck from a starting position into a target position, the steering method comprising,
   controlling automatically at least one of a rotatory component of the movement and a translatory component of the movement,
   selecting, via an operator, an automatic control of the at least one of the rotatory component of the movement and the translatory component of the movement prior to, or while, manually approaching the target position,
   ascertaining an actual rotational position of the multi-directional industrial truck by measuring a distance with respect to a target plane denoting the target position by at least one distance sensor, and
   actively intervening, via a steering device, in the steering method for the multi-directional industrial truck until an identified target position has been reached.

10. A route guidance system comprising:
    a multi-directional industrial truck comprising a steering device which comprises an assistance system comprising a single-sensor system or a multiple-sensor system, the assistance system being configured to perform a steering method for controlling a movement of the multi-directional industrial truck from a starting position into a target position, the steering method comprising,
       controlling automatically at least one of a rotatory component of the movement and a translatory component of the movement,
       selecting, via an operator, an automatic control of the at least one of the rotatory component of the movement and the translatory component of the movement prior to, or while, manually approaching the target position,
       ascertaining an actual rotational position of the multi-directional industrial truck by measuring a distance with respect to a target plane denoting the target position by at least one distance sensor,
       actively intervening, via a steering device, in the steering method for the multi-directional industrial truck until an identified target position has been reached,
       ascertaining the rotatory component of the movement,
       controlling automatically only the rotatory component of the movement,
       automatically measuring the actual rotational position of the industrial truck, comparing the actual rotational position of the multi-directional industrial truck measured to at least one of a stored or measured target rotational position, and if a deviation of the actual rotational position of the multi-directional industrial truck from the stored or measured target rotational position exists, selecting an automatic steering process so as to reduce the deviation, wherein, the ascertaining of the rotatory component of the movement is performed separately from an ascertaining of the translatory component of the movement; and at least one of geometries and markers not arranged on the multi-directional industrial truck, wherein, the steering method is performed to cooperate with the at least one of the geometries and the markers.

11. The route guidance system as recited in claim 10, wherein the steering method is performed to cooperate with the at least one of the geometries and the markers to determine at least one of the actual rotational position of the multi-directional industrial truck and the stored or measured target rotational position.

\* \* \* \* \*